Sept. 30, 1969  J. W. McCRACKEN  3,469,536
GRIPPING DRIVE VEHICLE
Filed Sept. 13, 1967
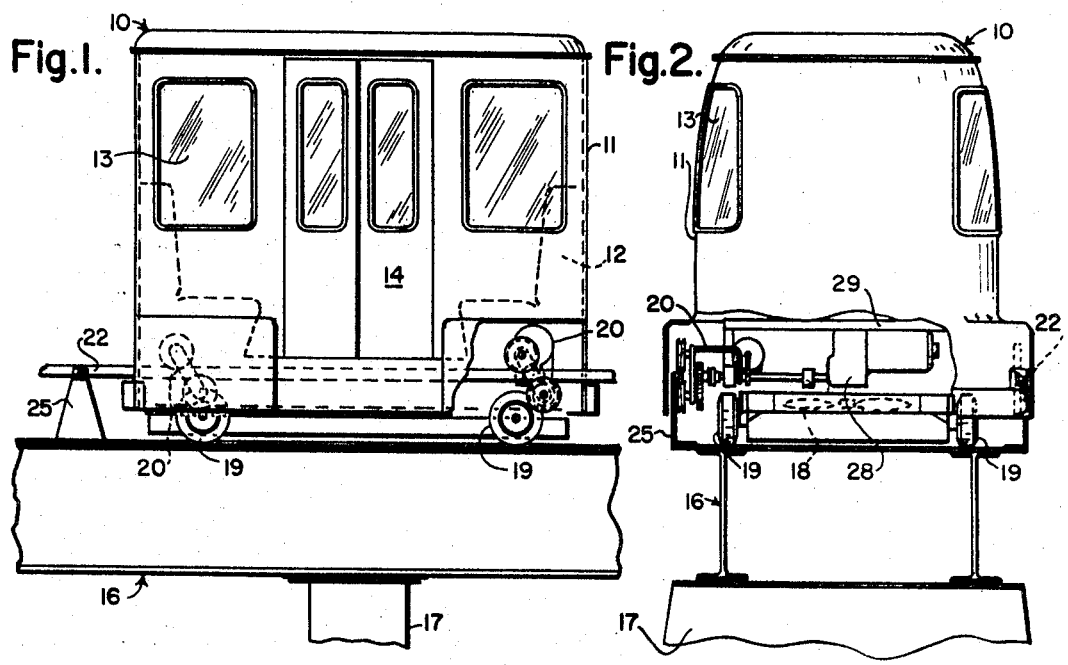
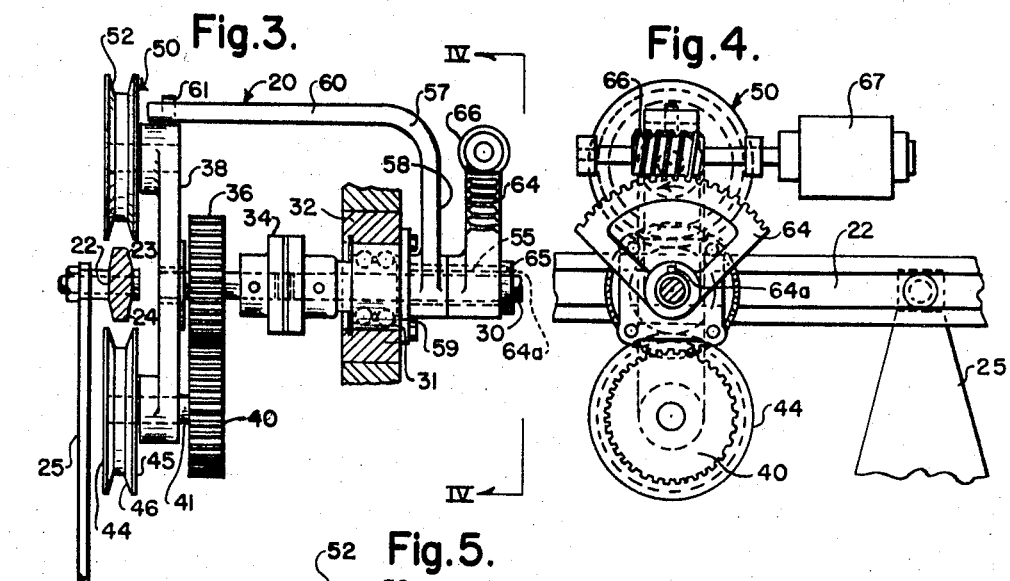
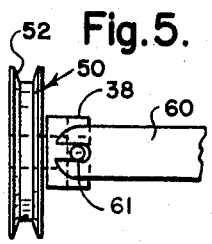
INVENTOR
James W. McCracken
his attorneys

United States Patent Office 3,469,536
Patented Sept. 30, 1969

3,469,536
GRIPPING DRIVE VEHICLE
James W. McCracken, c/o Leechburg Lumber Company,
Inc., Leechburg, Pa. 15656
Filed Sept. 13, 1967, Ser. No. 667,429
Int. Cl. B61c 11/00; B61b 5/02
U.S. Cl. 105—30
8 Claims

ABSTRACT OF THE DISCLOSURE

A gripping drive mechanism for a rail guided self-propelled vehicle movable over a transportation bed having laterally spaced guide rails. One such drive mechanism is provided on opposite sides of the vehicle, and each includes a reversible motor universally coupled to a drive gear supported for rotation by a lever arm. The drive gear engages a driven gear which is rotatably supported by a lever arm, and the drive gear, in turn, is coupled to a drive wheel which is engageable with the underside of a guide rail. An idler wheel is rotatably supported by the lever arm opposite the drive wheel and above the guide rail. An arm is connected to an upper portion of the lever arm and is arranged to selectively turn the lever arm so that the drive and idler wheels can engage or disengage the guide rail.

---

This invention relates to a drive mechanism for rail guided self-propelled vehicles.

One concept for a municipal rapid transit system is to elevate a transportation bed and to drive self-propelled vehicles over the path of the bed. The vehicles could take the form of compact capsules supported on the bed by an air cushion, pneumatic tires, or the like. Rails could be provided on which to drive the vehicles. These rails might also serve to selectively guide the vehicles along the main path of the bed or off of the main path and onto branch paths. I provide a simple and reliable drive mechanism for such rail guided self-propelled vehicles. Specifically, my drive mechanism comprises, preferably, a main frame, a power drive means supported by the main frame, a support means universally supported by the main frame, a drive wheel rotatably supported by the support means in operative relationship with the power drive means and adapted to be frictionally engaged with a guide rail, another wheel rotatably supported by the support means generally coplanarly opposite the drive wheel and also adapted to be frictionally engaged with the guide rail, and a shifting means operable with the support means for selectively positioning the support means to engage and disengage the wheels with the guide rail. My preferred embodiment describes one illustration of an application of my drive mechanism. In this illustration one such drive mechanism is arranged on opposite sides of an air cushioned self-propelled passenger vehicle. The transportation bed includes laterally spaced guide rails. One of the guide rails coextends with the main path of the bed and when the vehicle is travelling over the main path the wheels of the drive mechanism associated with this rail would be in engagement therewith. The other rail serves as a diverting rail for guiding the vehicle onto branch paths, as into a station location, for example. The wheels of the drive mechanism associated with the diverting rail would be disengaged therefrom. When it is desired to guide the vehicle onto the branch path the drive mechanisms are shifted so that the diverting rail is substantially simultaneously engaged with the disengagement of the main path guide rail.

Other details, objects and advantages will become apparent as the following description of a present preferred embodiment thereof proceeds.

In the accompanying drawings I have shown a present preferred embodiment of the invention in which:

FIGURE 1 is a side elevation view partially in section of a rail guided self-propelled air cushion supported passenger vehicle embodying the present invention and showing certain elements thereof;

FIGURE 2 is an end view of the vehicle of FIGURE 1;

FIGURE 3 is an exploded elevation view partially in section of the drive mechanism of the present invention as it would be viewed in FIGURE 2, showing further details of construction;

FIGURE 4 is a view looking in the direction of the arrow of line IV—IV of FIGURE 3;

FIGURE 5 is a partial plan view of FIGURE 3.

Referring now to the drawings wherein like reference numerals refer to like parts throughout the various views, 10 generally designates a passenger vehicle having a typical enclosed main body 11, suitably supporting longitudinally opposed seat 12, windows 13, and a centrally disposed power actuated slidable door 14. Vehicle 10 is suitably shaped to travel over an elongated transportation bed 16, supported above ground level by a plurality of any suitable well known members, such as concrete columns 17, for example. Vehicle 10 is provided with suitable means for suspending it above bed 16, such as, for example, a power driven downwardly directed fan 18 having suitable inlet and outlet ducting for providing an air cushion for supporting the vehicle. Such air cushion suspension means are well known as illustrated by the various existing ground effects hovering vehicles. Suitable means, such as, for example, axle bearing pneumatic tires 19 supported by main body 11, are provided for supporting the vehicle 10 on bed 16 when it is not being suspended on an air cushion.

The drive mechanism, generally designated 20, will serve to propel the vehicle 10 over the transportation bed 16. As shown, a pair of identical drive mechanisms 20 is supported by main body 11, one of the drive mechanisms 20 being disposed at a left end portion of body 11 as viewed in FIGURE 2, and the other drive mechanism being diagonally opposite at the right end portion of main body 11.

As will be fully described hereinafter, each drive mechanism is adapted for operative engagement with identical guide rails 22 disposed at the lateral ends of transportation bed 16. Each rail 22 is elongated with the transverse centerline of each lying in a substantially horizontal plane. The main body of each rail 22 has upper and lower identical frusto-conical shaped portions 23 and 24 respectively symmetrical about the horizontal plane passing through the longitudinal centerline of the rail 22. Each rail 22 is suitably fixed to an upper portion of upwardly extending vertical rigid plate members 25 suitably supported by transportation bed 16.

As was noted previously, each drive mechanism 20 is identical. For sake of clarity of description only the left hand drive mechanism will be described with the understanding that the description applies to both. The drive mechanism 20 includes a reversible electric motor 28 suitably supported to a main frame 29 detachably fixed to an underside portion of main body 11 of the vehicle 10. The drive shaft 30 of the motor 28 extends in the direction of rail 22, with the axis of drive shaft 30 lying in the horizontal plane which includes the transverse centerline of rail 22. Drive shaft 30 is given additional support at its free end portion by roller bearing 31 suitably fixed in bearing housing 32 which in turn is suitably fixed to main frame 29. The free end of drive shaft 30 extends slightly beyond bearing housing 32 and is fixedly connected to one end of a well-known type spring loaded universal joint 34. As will be appreciated by further reading, universal joint 34 permits the drive mechanism 20 to follow the winding path of the rail 22 as well as the upward and downward movements of main body 11. The other end of universal joint 34 is fixed to a spur drive gear 36 having its axis coaxial with drive shaft 30. Drive gear 36 is suitably rotatably received centrally in an elongated lever member 38. As shown in FIGURE 3, the longitudinal centerline of lever member 38 lies in a generally vertical plane parallel to the longitudinal centerline of rail 22. A spur driven gear 40 is suitably rotatably supported by lever member 38 and operatively engages drive gear 36 in the same vertical plane therewith. The output shaft 41 of driven gear 40 extends slightly beyond lever member 38. Connected to the free end of output shaft 41 is drive wheel member 44 having a wheel 45 with a circumferential frusto-conical groove 46 about its periphery. The groove 46 of wheel 45 is complementary in shape with the lower portion 24 of rail 22. The wheel 45 is positioned to have its radial plane of symmetry coplanar with the vertical plane of symmetry of rail 22. The material of the wheel 45 has the characteristics of permitting frictional rolling engagement of the groove 46 of the wheel 45 with the lower portion 24 of rail 22.

An idler wheel member 50 is suitably rotatably supported by lever member 38 at an upper portion thereof. Idler wheel member 50 has a wheel 51 identical in shape with wheel 45 of drive wheel member 44 and coplanar therewith. That is, wheel 51 has a circumferential frusto-conical groove 52 complementary in shape with upper portion 23 of rail 22. The material of wheel 51 should also be selected, like that of wheel 45, to permit frictional rolling engagement of groove 52 with upper portion 23 of rail 22.

A generally cylindrically shaped sleeve member 55 is coaxial with drive shaft 30 of motor 28 and is disposed immediately inwardly or rightwardly of bearing 31. An L-shaped elongated rigid arm 57 is pivotally supported at the lower end portion 58 thereof to a left end portion of sleeve member 55. A collar 59 fixes arm 57 on sleeve member 55 against any leftward translational movement thereof. The upper end portion 60 of arm 57 is bifurcated and slidably fits around an upwardly extending cylindrical portion 61 of lever member 38. This is clearly shown in FIGURE 5. The open upper end of arm 57 permits the lever member 38 and arm 57 to move with respect to each other as would result when the wheels 44 and 51 slightly turn with a curved portion of rail 22 or main body 11 of vehicle 10 moves slightly upwardly or downwardly to carry arm 57 along with it.

A sector gear 64 is pivotally coaxially supported at its lower end by sleeve member 55 and lies in a substantially vertical plane generally parallel with the vertical plane including the centerline of lever member 38. The sector gear 64 is fixed to the arm 57 by suitable means such as key 64a. A collar 65 fixes sector gear 64 on sleeve member 55 against any rightward translational movement thereof. The sector gear 64 spans an arcuate distance of a magnitude such that rotation of the sector gear 64 from its position shown in FIGURE 4 to either extreme thereof causes lever member 38 to rotate such that wheels 45 and 51 will engage the lower and upper portions 24, 23 of rail 22, respectively. With sector gear 64 positioned as shown in FIGURE 4 the lever member 38 is so positioned that wheels 45 and 51 are disengaged from rail 22. Sector gear 64 is selectively driven by worm 66 suitably driven by a reversible electric motor 67 coupled therewith, which motor 67, is in turn, suitably supported by main frame 29.

In operation of the drive mechanism 20 of the present invention, the motor 67 is energized to drive worm 66 which in turn drives sector gear 64. As shown in FIGURES 3 and 4, worm 66 is driven clockwise to drive sector gear 64 towards the left. Sector gear 64 accordingly turns arm 57 which transmits a turning force to lever member 38. Lever member 38 turns about its center point and carries wheels 45 and 51 about a circular path until they engage rail 22. Drive wheel member 44 is being driven by motor 28 through the gear train made up of drive gear 36 and driven gear 40. When wheel 45 of drive wheel member 44 engages lower portion 24 of rail 22 the air cushion suspended vehicle 10 is then driven over transportation bed 16. To disengage wheels 45 and 51 from rail 22 the worm 66 is rotated in a counterclockwise direction as viewed in FIGURE 3 to turn arm 57 which will turn lever member 38 to cause wheels 45 and 51 to disengage from rail 22. One practical application of a pair of my drive mechanisms 20 combined with a suspended vehicle was illustrated hereinbefore in the introductory matter.

It is noted that the sector gear 64 could be conveniently shaped so that only one direction of travel from wheel-engage to wheel-disengage would be available.

It is further noted that the arm 57, sector gear 64 and worm 66 comprises a shifting means for lever member 38. Moreover, the described arrangements of the elements of such shifting means is not the only arrangement for causing the engaging and disengaging of wheels 45 and 51 with rail 22. Those skilled in this particular art would recognize various other shifting arrangements for providing the same results as the shifting means described herein.

While I have shown and described a present preferred embodiment of the invention it is to be distinctly understood that the invention is not limited thereto but may be otherwise variously embodied within the following claims.

I claim:

1. A drive mechanism for a rail guided self-propelled vehicle including means for suspending such vehicle above a transportation bed, comprising: a main frame; power drive means supported by said main frame and having drive shaft means with the axis of rotation thereof lying generally on a horizontal plane; support means including an upstanding elongated lever member mounted on said drive shaft means for rotation about the transverse axis thereof and independently of the rotation of said drive shaft means; a drive wheel member rotatably supported at one end portion of said lever member and operatively coupled with said drive means; an idler wheel member rotatably supported at the other end portion of said lever member and generally coplanar with said drive wheel; said wheel members arranged on said lever member for frictionally engaging opposite sides of the guide rail; and actuatable shifting means operative with said lever means for selectively rotating said lever means to engage and disengage said wheel members with the guide rail while the wheel members remain substantially in the same plane.

2. A drive mechanism as set forth in claim 1 wherein said power drive means and said drive shaft means include a reversible electric motor having a drive shaft member extending therefrom; including a universal joint means fixed at one end portion thereof to said drive shaft member, drive gear means fixed to the other end portion of said universal joint means and substantially coaxial with said drive shaft member, and driven gear means operatively engaging said drive gear means and having an output shaft rotatably supported by said lever member at a lower portion thereof, said output shaft being operatively coupled with said drive wheel member; said lever member being mounted for rotation on said other end portion of said universal joint means.

3. A drive mechanism as set forth in claim 2 wherein said shifting means including an arm member supported by said drive shaft means and rotatable independently thereof and coupled to a portion of said lever member, actuating means supported by said main frame and operatively connected with said arm member for selectively rotating said arm member within a predetermined angular displacement for engaging and disengaging said wheel members with the guide rail.

4. A drive mechanism as set forth in claim 1 wherein said lever member has its longitudinal centerline lying in a substantially vertical plane; said idler wheel is rotatably supported at an upper portion of said lever member; said power drive means and said drive shaft means include a first reversible motor and a drive shaft member extending therefrom with its axis passing transversely through the center portion of said lever member; and including a universal joint means fixed at one end portion thereof to said drive shaft member, a drive gear means fixed to the other end portion of said universal joint means and substantially coaxial with said drive shaft member, a driven gear means operatively engaging said drive gear means and having an output shaft rotatably supported by and transverse to said lever member at a lower portion thereof, said output shaft being operatively coupled with said drive wheel member; said lever member being mounted for rotation on said other end portion of said universal joint means; said shifting means includes an arm member supported by said drive shaft member and rotatable independently thereof and coupled to said lever member at an upper portion thereof, a sector gear member supported by said drive shaft member and rotatable independently thereof and operatively connected to said arm member, worm gear means engaging said sector gear, and a second reversible motor operatively coupled to said worm gear means.

5. In combination with an elongated transportation bed including a pair of laterally oppositely disposed guide rails, a self-propelled vehicle body including means for supporting such vehicle on said bed, a pair of oppositely spaced drive mechanisms for said vehicle, each of said drive mechanisms comprising: a power drive means supported by said vehicle body and having drive shaft means with the axis of rotation thereof lying generally on a horizontal plane; support means including an upstanding elongated lever member mounted on said drive shaft means for rotation about the transverse axis thereof and independently of the rotation of said drive shaft means; a drive wheel member rotatably supported at one end portion of said lever member and operatively coupled with said drive means; an idler wheel member rotatably supported at the other end portion of said lever member and generally coplanar with said drive wheel; said wheel members arranged on said lever member for frictionally engaging opposite sides of said one guide rail; and actuatable shifting means operative with said lever member for selectively rotating said lever member to engage and disengage said wheel members with said one guide rail while the wheel members remain substantially in the same plane.

6. The combination as set forth in claim 5 wherein said power drive means and said drive shaft means include a reversible electric motor having a drive shaft member extending therefrom; including universal joint means fixed at one end portion thereof to said drive shaft member, drive gear means fixed to the other end portion of said universal joint means and substantially coaxial with said drive shaft member, driven gear means operatively engaging said drive gear means and having an output shaft rotatably supported by said lever member at a lower portion thereof, said output shaft being operatively coupled with said drive wheel member; said lever member being mounted for rotation on said other end portion of said universal joint means.

7. The combination as set forth in claim 6 wherein said shifting means includes an arm member supported by said drive shaft means and rotatable independently thereof and coupled to a portion of said lever member, actuating means supported by said drive shaft means and rotatable independently thereof and operatively connected with said arm member for selectively rotating said arm member within a predetermined angular displacement for engaging and disengaging said wheel members with said one guide rail.

8. The combination as set forth in claim 5 wherein said lever member has its longitudinal centerline lying in a substantially vertical plane; said idler wheel member is rotatably supported at an upper portion of said lever member; said power drive means and said drive shaft means include a first reversible motor having a drive shaft member extending therefrom with its axis passing transversely through the center portion of said lever member; including a universal joint means fixed at one end portion thereof to said drive shaft member, a drive gear means fixed to the other end portion of said universal joint means and substantially coaxial with said drive shaft member, a driven gear means operatively engaging said drive gear means and having an output shaft rotatably supported by and transverse to said lever member at a lower portion thereof, said output shaft being operatively coupled with said drive wheel member; said lever member being mounted for rotation on said other end portion of said universal joint means; said shifting means includes an arm member supported by said drive shaft member and rotatable independently thereof and coupled to said lever member at an upper portion thereof, a sector gear member supported by said drive shaft member and rotatable independently thereof and operatively connected to said arm member, worm gear means engaging said sector gear, a second reversible motor operatively coupled to said worm gear means.

References Cited

UNITED STATES PATENTS

| 63,184 | 3/1867 | Staikpole | 105—30 X |
|---|---|---|---|
| 302,400 | 7/1884 | Hayes | 105—30 X |
| 521,146 | 6/1894 | Hildebrand | 105—30 X |
| 538,278 | 4/1895 | Place | 105—30 X |
| 724,367 | 3/1903 | Wood | 105—30 X |
| 1,417,088 | 5/1922 | Mathews | 105—144 |
| 1,697,636 | 1/1929 | Dobbins | 105—144 |
| 3,198,138 | 8/1965 | Melcher | 105—215 X |

ARTHUR L. LA POINT, Primary Examiner

H. BELTRAN, Assistant Examiner

U.S. Cl. X.R.

105—144, 153, 215